United States Patent
Ichikawa et al.

(10) Patent No.: US 7,397,974 B2
(45) Date of Patent: Jul. 8, 2008

(54) OPTICAL MODULATOR

(75) Inventors: Junichiro Ichikawa, Tokyo (JP); Takahisa Fujita, Tokyo (JP); Yuji Yamane, Tokyo (JP); Norikazu Miyazaki, Tokyo (JP); Mitsuru Sakuma, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 10/485,428

(22) PCT Filed: Jul. 31, 2002

(86) PCT No.: PCT/JP02/07770
§ 371 (c)(1),
(2), (4) Date: Aug. 6, 2004

(87) PCT Pub. No.: WO03/012533
PCT Pub. Date: Feb. 13, 2003

(65) Prior Publication Data
US 2004/0264827 A1    Dec. 30, 2004

(30) Foreign Application Priority Data
Aug. 1, 2001   (JP) .............................. 2001-233427

(51) Int. Cl.
   *G02F 1/35*   (2006.01)
(52) U.S. Cl. ........................................... 385/2
(58) Field of Classification Search ............ 385/2, 385/3
   See application file for complete search history.

(56) References Cited

U.S. PATENT DOCUMENTS

| 5,502,780 A | * | 3/1996 | Rangaraj | .......................... 385/3 |
| 5,991,491 A | * | 11/1999 | Madabhushi | ................. 385/131 |
| 6,021,232 A | * | 2/2000 | Madabhushi | .................... 385/3 |

FOREIGN PATENT DOCUMENTS

| JP | 01298313 A | * | 12/1989 |
| JP | 05080281 A | * | 4/1993 |
| JP | 06-300994 | | 10/1994 |
| JP | 10/142567 | | 5/1998 |
| JP | 10213783 A | * | 8/1998 |
| JP | 11006932 A | * | 1/1999 |

* cited by examiner

Primary Examiner—Frank G Font
Assistant Examiner—Erin D Chiem
(74) Attorney, Agent, or Firm—Chapman and Cutler LLP

(57) ABSTRACT

The present invention offers an optical modulator capable of efficiently transmitting electric signals to an interaction part of a signal electrode with acting on an optical waveguide even when the electric signals are in a high frequency zone, and capable of performing high frequency broad-band operation. The optical modulator comprises a substrate 1 formed of a material having electro-optical effect, an optical waveguide formed on the substrate, and an electrode 3 for modulating the light passing through the optical waveguide. The optical modulator is characterized in that an electric signal connection pad unit 6 is provided on a part of the electrode, and in that the thickness of the substrate located on a lower part of at least the electric signal connection pad unit 6 and directly or indirectly continuous to the electric signal connection pad unit 6 is thinner than the thickness of another part of the substrate including an interaction part of the electrode by cutting off a part of the substrate, and is less than about 250 μm.

11 Claims, 10 Drawing Sheets

Optical wave (a)

(b)

OPTICAL MODULATOR

BACKGROUND OF THE INVENTION

(1) Field of the Invention

The present invention is related to an optical modulator, in particular an optical modulator used as an optical intensity modulator, phase modulator, and polarized wave modulator, for high-speed and high-capacity optical fiber communications.

(2) Related Art Statement

Recently, with the progress of high-speed and high-capacity optical fiber communications, as represented by the exterior modulator, high-speed modulators using a substrate formed of a material having electro-optical effect, like lithium niobate, are in practical use. This high-speed modulator comprises substrate 1 formed of a material having electro-optical effect, with waveguide 2 that guides the optical wave, and modulate electrode comprising ground electrode 4 and signal electrode 3 that applies the high-speed modulate signal in the microwave band to the said optical wave, as shown in FIG. 1.

To optical waveguide 2, an optical wave will enter from the end side of optically polished substrate. When passing the optical waveguide 2, the phase of the optical wave will transform because of changing reflective index of the substrate by the electric signal applied to the electrode, and so, in the Mach-Zehnder optical modulator like FIG. 1, phase transformation will be the strength modulation of the optic. Then, the optical wave, which has been affected with the strength transformation according to the electric signal, will exit from the other end of the optical waveguide 2.

The electric connection of the signal electrode 3 and ground electrode 4 of the optical modulator is usually done from the side of the substrate because of the convenience of the wiring usage, and also electric signal connection pad 6 is located on the signal electrode 3 to connect the wiring from the coaxial cable.

Microwave, which is an electric signal, is provided from the coaxial cable, is conveyed to the signal electrode 3 through the electric signal connection pad, goes thorough the bend point 7 of the signal electrode 3, and goes into the interaction part 8 of the optical wave-guide 2. In these wirings, because of the rapid change of the electric property of electrical line, part of the micro wave as an electric signal reflects at the connecting point, other parts escape into the substrate, and other left parts radiate outside the substrate in consequence. For this reason, electric signal which transmits to the interaction part 8 of the signal electrode 3 decreases, and effective modulation of the optical wave which passes through the optical wave guide becomes difficult.

To counteract this problem, efforts to reduce the loss of microwaves' reflection and escape, by forming the signal electrode 3 and ground electrode 4 to be as a co-planar type of plane electrode, connecting coaxial cable by impedance matching, or easing the bend point of the signal electrode 3, have been tried, but effective reduction was difficult in the high frequency zone over 20 GHz.

SUMMARY OF THE INVENTION

The purpose of this invention is, to offer an optical modulator providing high frequency broadband operation, which can effectively convey the electric signal to the interaction part of the optical wave-guide of the signal electrode, even if the electric signal exists in the high frequency zone.

In order to achieve the above-described purpose, the optical modulator of the instant invention comprises a single substrate formed of a material having electro-optical effect, an optical waveguide formed on the substrate, and an electrode for modulating light passing through the optical waveguide, with an electric signal connection pad unit provided on part of the electrode, and thickness of the substrate located on a lower part of at least the electric signal connection pad unit and directly or indirectly continuous to the electric signal connection pad unit, is thinner than thickness of another part of the substrate including an interaction part of the electrode by cutting off a part of the substrate, and is less than about 250 µm.

In another aspect of this invention, by forming a channel on the side of the substrate, the substrate located on a lower part of the electric signal connection pad unit and directly or indirectly continuous to the electric signal connection pad unit, is made thin.

In another aspect of this invention, the optical modulator is supported by a chassis, and space is provided between a surface of the chassis and the electric signal connection pad unit on a lower part of the electric signal connection pad unit.

In another aspect of this invention, material having electro-optical effect forming the substrate is a material selected from the group consisting of $LiNbO_3$ crystal, $LiTaO_3$ crystal, and solid solution crystal of $LiNbO_3$ and $LiTaO_3$.

In another aspect of this invention, the optical waveguide is a Mach-Zehnder type waveguide having divergent waveguides, the thickness of the substrate directly or indirectly continuous to the electric signal connection pad unit is partly thinner than a remaining part of the substrate and said remaining part of said substrate is thinned so that a change of the whole thickness becomes practically symmetrical against a centerline of the divergent waveguides in the Mach-Zehnder type waveguide.

DETAILED DESCRIPTION OF THE INVENTION

The following is a detailed description of the present invention using a favorable example.

The substrate forming the optical modulator is made of a material having electro-optical effect, such as lithium niobate ($LiNbO_3$; hereinafter referred to as LN), lithium tantalite ($LiTaO_3$), PLZT (lead lanthanum zirconate titanate), and silica. In particular, the substrate is constituted by the X cut board, Y cut board, and Z cut board of these single crystal materials. Especially, because of easy formation as an optical waveguide device, and because of having strong anisotropy, $LiNbO_3$ crystal, $LiTaO_3$ crystal, or solid solution crystal consisting of $LiNbO_3$ and $LiTaO_3$, are preferred. In the practical examples, lithium niobate (LN) is mainly used for explanation.

There are methods to produce optical modulator, which use heat diffusing Ti on LN substrate for forming a wave guide, and then form an electrode directly on LN substrate without setting up a buffer layer on a part or the whole of the substrate, or, that form an electrode indirectly with formation of a buffer layer as dielectric $SiO_2$ on the LN substrate to reduce the light transmission loss in the optical waveguide, and then form an electrode pattern of Ti or Au on it, and form a signal electrode and a ground electrode having a height of several tens μm by plating with gold.

In the present invention, an electric connection pad unit is formed directly on a substrate without a buffer layer, or indirectly on a substrate by providing a buffer layer between the electric connection pad unit and substrate as described above.

Said buffer layer could be considered to be multi-layer structure by providing films such as SiN or Si on top of the dielectric layer as $SiO_2$.

Figure 1:
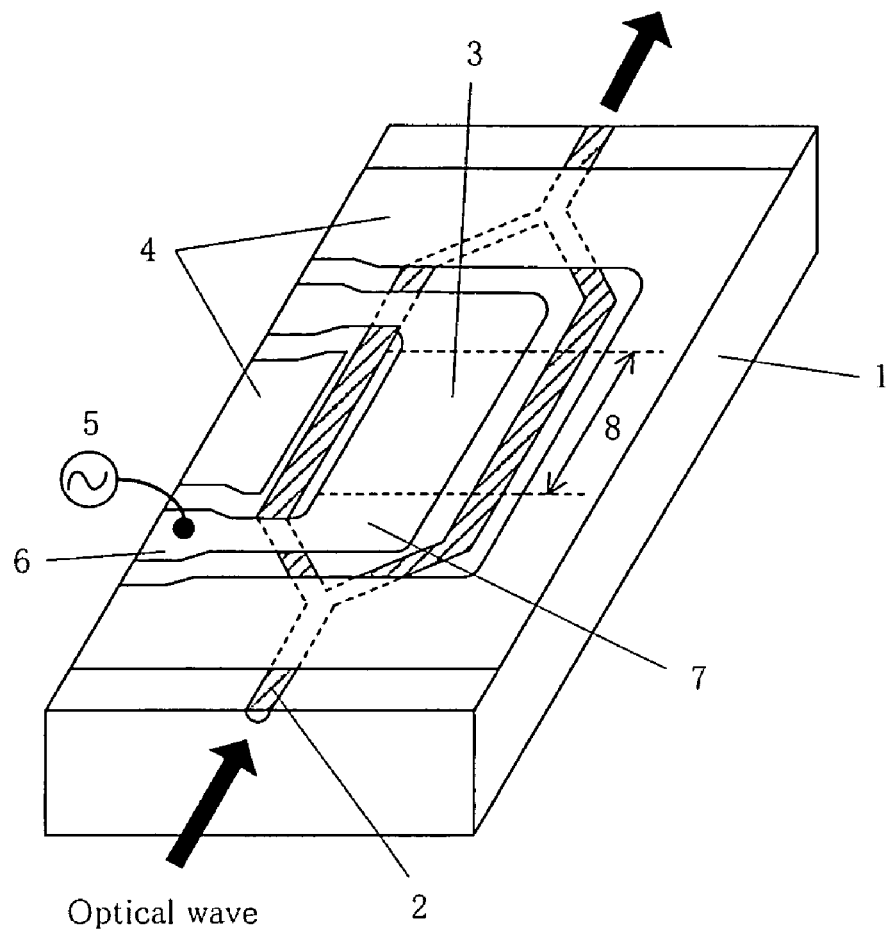
FIG. 1 is a simplified diagram of a known optical modulator.

Generally, building plural optical modulators on one LN wafer and then dividing the wafer into individual chips (individual optical modulators) will yield an optical modulator such as that prior art modulator shown in FIG. 1.

In the present invention, by forming the following two structures in an optical modulator such as that in FIG. 1, improvement of high frequency character is made.

In the first example, by conducting a cut off process of the rear face of LN substrate, the thickness of the part of the substrate is made thinner. And in the second example, via a cutting off process from the side of LN substrate, the channel part is formed.

Figure 2:
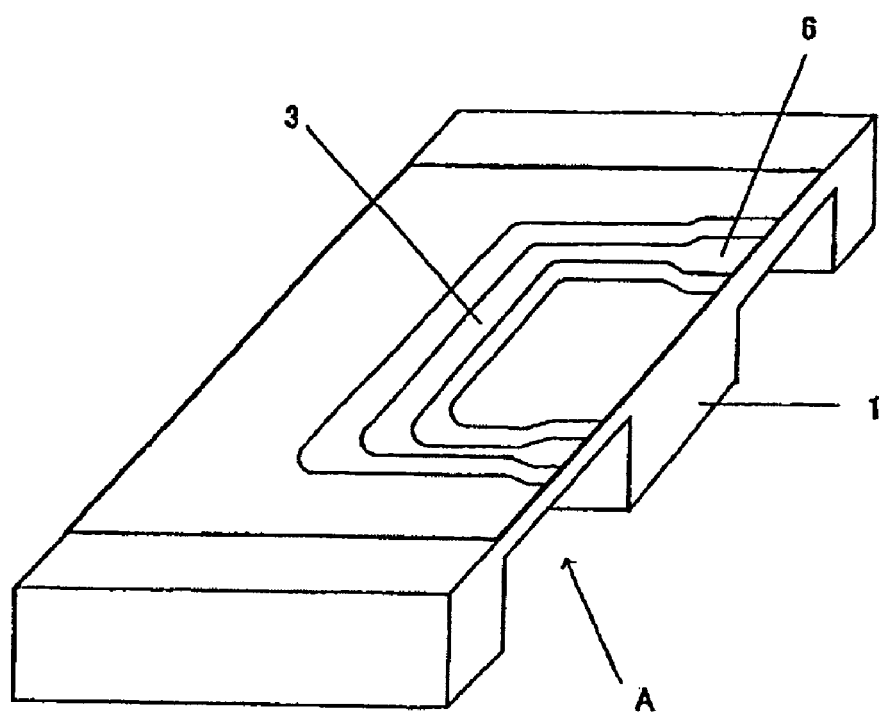
FIG. 2 shows the optical modulator with cutting off the part of the substrates' rear face.

In the first example, the rear face of the substrate having 1 mm thickness is cut off to make the thickness 200 μm by method of sand-blasting or core-drilling (See FIG. 2. Reference arrow A shows the cutting-off part).

Next, to conclude the optimum part at the cutting-off part, the transformation of the frequency character between each cutting-off part was investigated.

Figure 3:
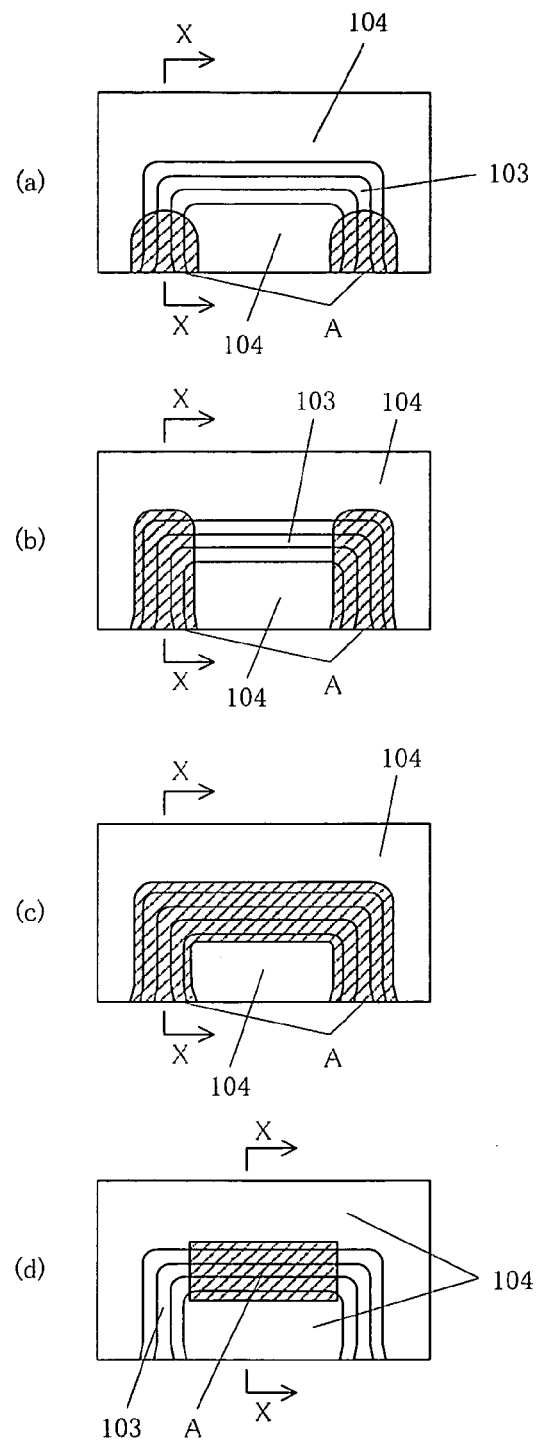
FIG. 3 is a graph showing the place to cut on the substrates' rear face of the optical modulator.

As the cutting-off parts, there were prepared: one in which only parts under electric signal connection pad unit are cut off (element A. See FIG. 3(a)), one in which parts under said pad and the bend point are cut off (element B. See FIG. 3(b)), one in which a part under said pad, bend point, and the interaction part is cut off (element C. See FIG. 3(c)), one in which only a part under operating point is cut off (element D. See FIG. 3(d)), and one in which no part is cut off (element E).

Figure 8:
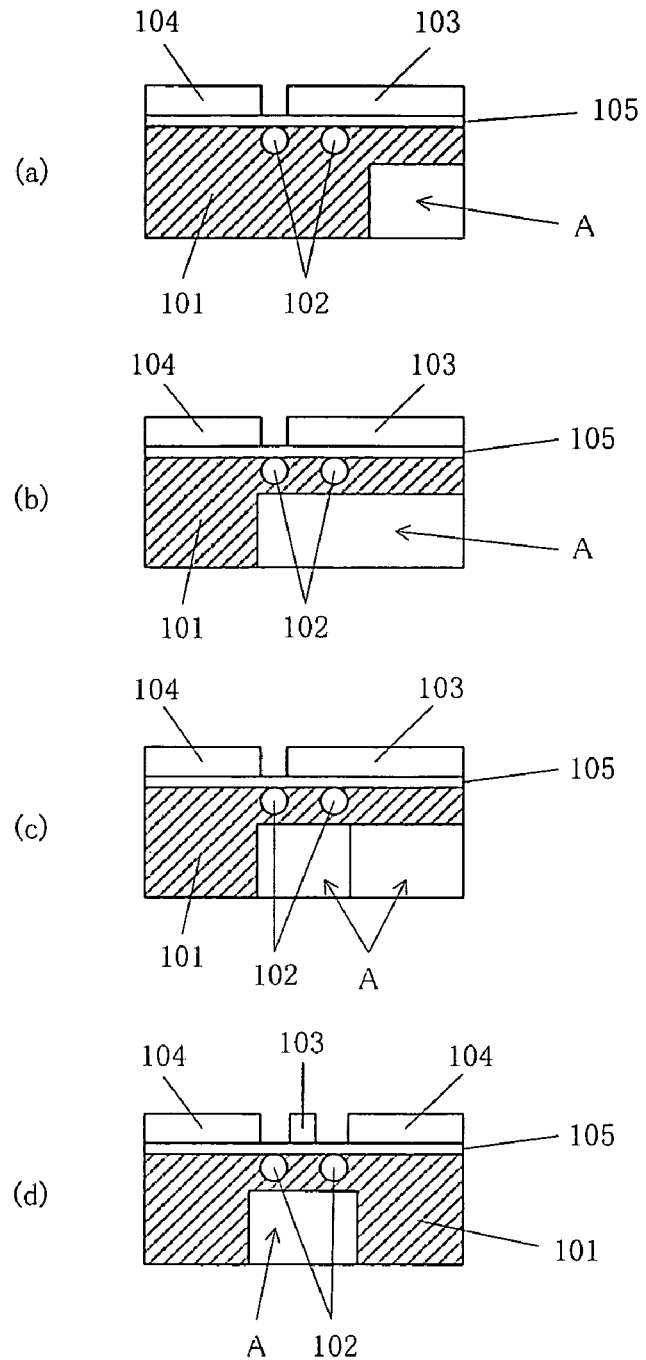
FIGS. 8(a)-(d) are cross-sectional diagrams of respective optical modulators shown in FIG. 3.

In order to show respective cutting-off parts in FIGS. 3(a) to (d) more clearly, FIGS. 8(a) to (d) show cross-sectional diagrams of the optical modulator along the line X-X in FIGS. 3(a) to (d). FIG. 8(a) is the cross-sectional diagram of FIG. 3(a) along the line X-X. 101 denotes a substrate; 102 an optical waveguide; 103 a signal electrode; 104 a ground electrode; 105 a buffer layer; and a part indicated by the arrow A is a cutting-off part. In a similar way, FIG. 8(b) is the cross-sectional diagram of FIG. 3(b); FIG. 8(c) of FIG. 3(c); and FIG. 8(d) of FIG. 3(d).

Figure 4:
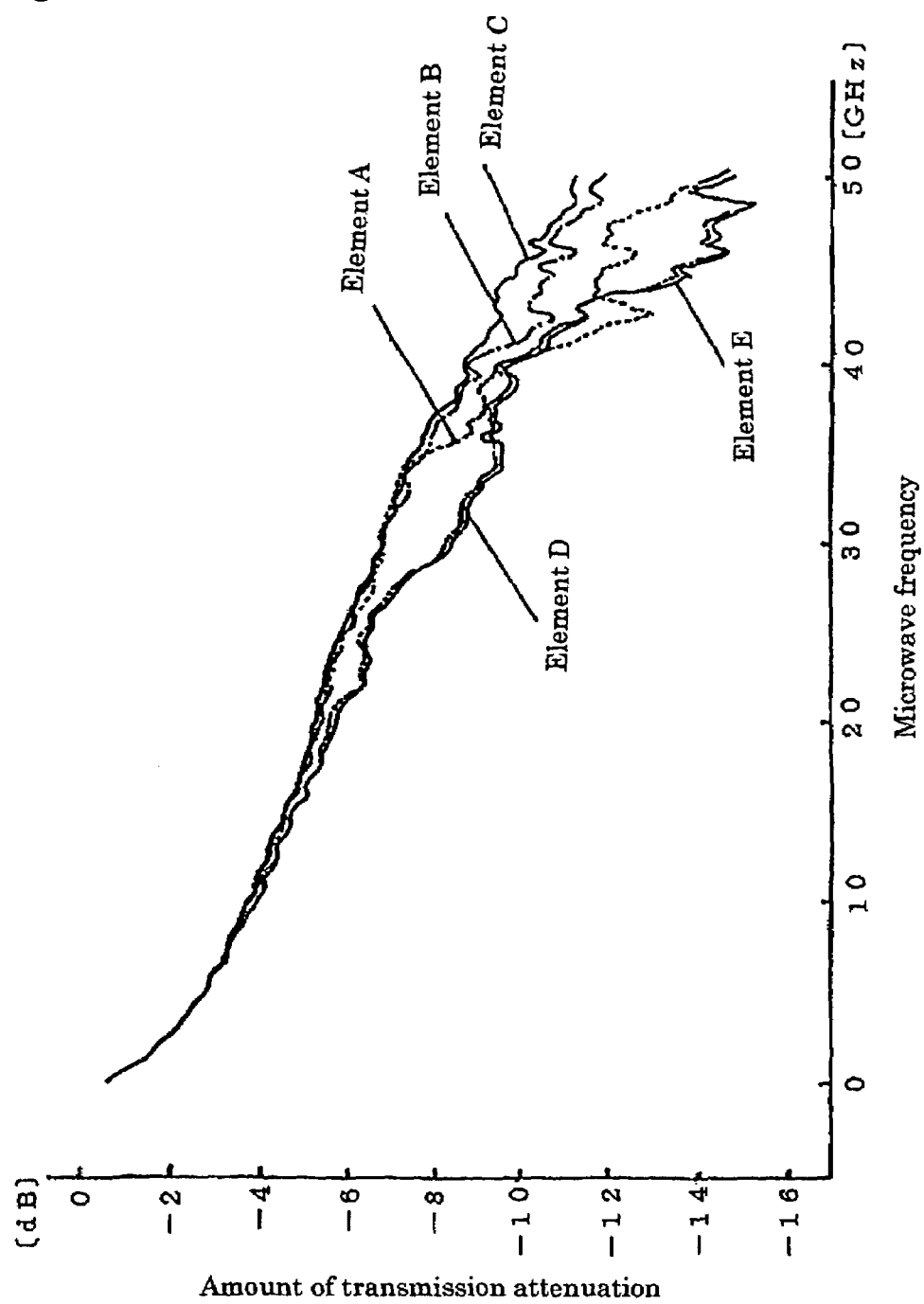
FIG. 4 shows amount of microwave transmission attenuation versus frequency in the first example.

FIG. 4 shows the result of measuring an amount of microwave transmission attenuation against frequency regarding to each element A to E.

As the result shows, at the point over 25 GHz, element A, B and C decreases amount of the attenuation more than element D or E. And at the point over 40 GHz, element B and C shows more effect of decreasing amount of the attenuation.

Therefore, by making the thickness of the substrate under the electric signal connection pad unit thinner than the other part of the substrate, preventing the reduction of microwave becomes possible. Especially by making the substrate thinner at the area from the pad to the bend point of the signal electrode, reducing at a higher frequency band becomes possible.

Besides, if the thin part of the substrate is spread to the operating point where the modulation of the optical wave that passes in the waveguide is done, effect at some level will be expected, but the thin part of the substrate will be increased in whole, mechanical strength of it will decline, and negative effect such as breaking of substrate may occur.

Figure 5:
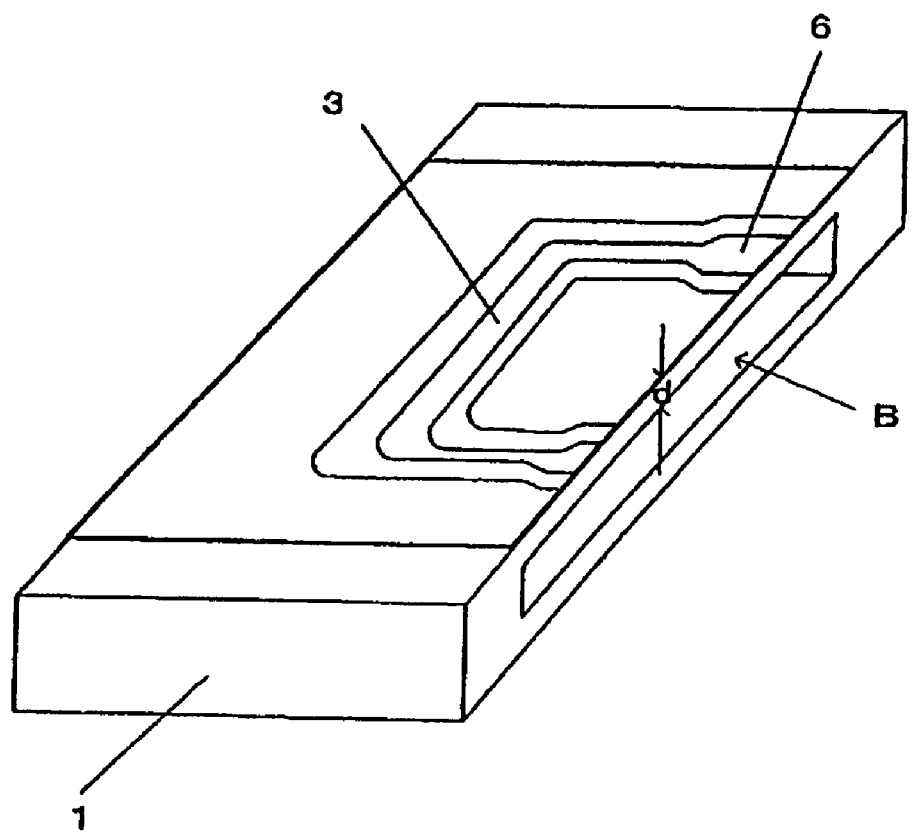
FIG. 5 shows the optical modulator with a channel on the side of the substrate.

In the second example, as shown in FIG. 5, channel B is formed by processing with a dicing saw at the side of substrate 1 that also has 1 mm thickness.

For the method of process, one or more chips (modulator) are fixed by fixture with the side of substrate up. Fixture has pressure parts made of Si on Si base. The fixing wax is applied between the chips and pressure parts, and the chips are fixed on Si base by pressure parts pushing the chips. Then by rotating the process blade with contacting the substrate side of chip, a channel with necessary depth and length is formed to the side of substrate.

Next, related to the thickness of substrate formed the channel (thickness of thin part), to search for the appropriate thickness of value d (FIG. 5), frequency character was investigated in the cases that vary the thickness d was varied by the difference of formulated location of channel.

For the sample, thickness d of the thin part with 150 μm (element F), 200 μm (element G), 250 μm (element H), 300 μm (element I), and one in which no channel is formed (element J) were prepared. Width of the channel in all the samples was 300 μm.

Figure 6:
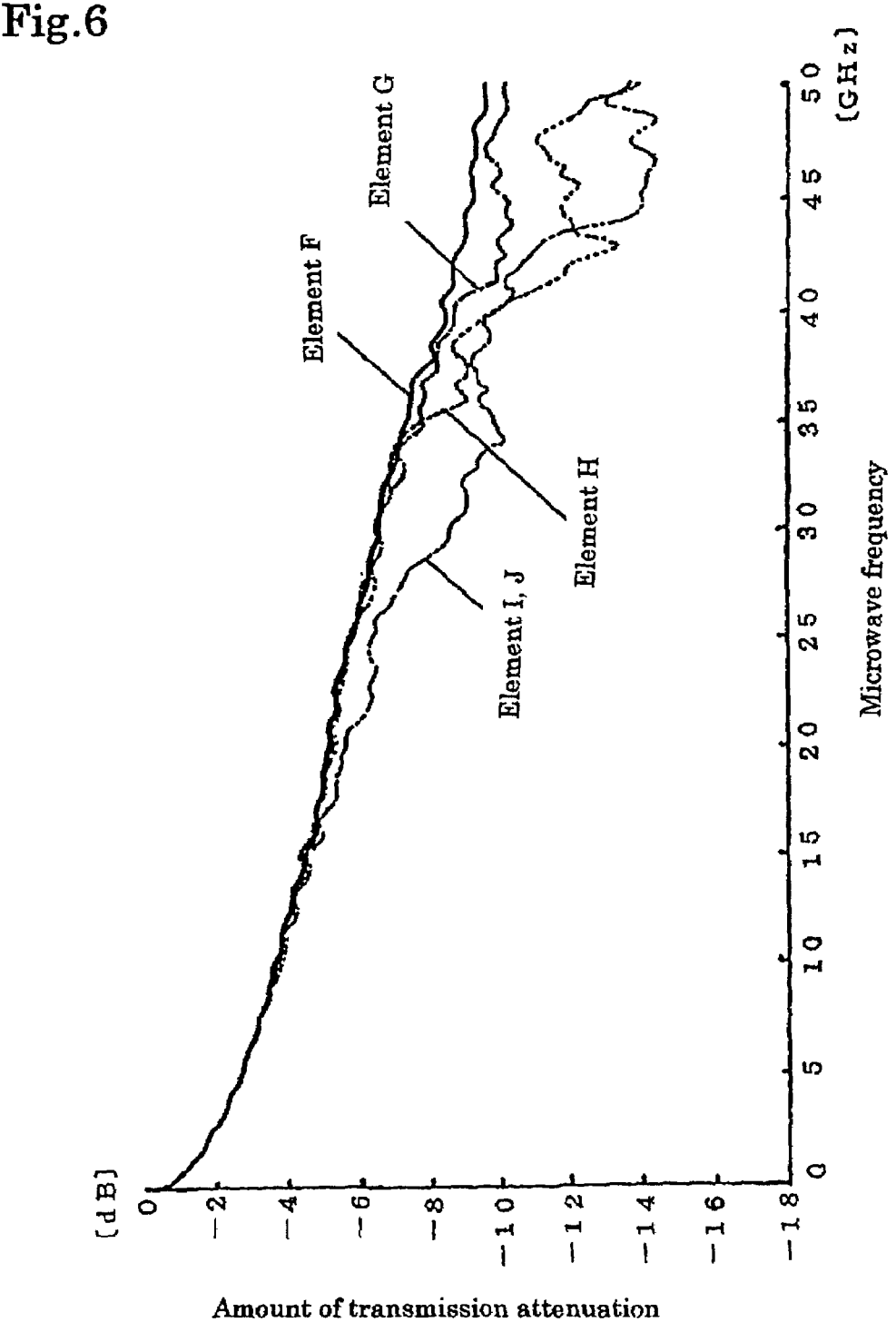
FIG. 6 is a graph showing the amount of microwave transmission attenuation versus frequency in the first example.

In FIG. 6, the measurement result of the microwave transmission attenuation amount against frequency related to each element F to J, is shown.

As the measurement result shows, for elements F, G, H, over 25 GHz, the amount of attenuation is reduced drastically compared to elements I and J (since I and J show almost the same level of frequency characteristic, they are shown as the same graph on FIG. 6). As the thickness becomes thinner, the effect becomes higher.

Therefore, by making the thickness of the part of the substrate that contains the electro signal connection pad unit under about 250 μm, control of the attenuation of microwave in high frequency becomes possible. By setting the thickness d of the substrate under about $\lambda/(10n)$ ($\lambda$ is the wavelength of microwave, n is refractive index of the substrate), control of the microwave radiation out of the substrates will be possible.

The width of the channel is set as 300 μm in the example, but the present invention is not limited by this. Generally, when the width becomes narrow, the phenomenon of microwave escape with passing the channel will occur and the effect to form a channel becomes weak. On the other hand, if the channel is too wide, it may cause cracking of substrate during processing with a dicing saw. Therefore, in the permissible range of the effect, width of the channel could be appropriately set.

In addition, channel length is composed as identical as the whole long way of the optical modulator in the present example. However, from the perspective to control the transport loss of microwave from the signal electrode, only in the specific zone that includes the electric signal connection pad unit and the bend point of the electrode, channel could be composed from the side of the substrate.

In addition, the optical modulator usually is fixed on a chassis made of brass or stainless. Even if the thin part is formed in some part of the substrate by processing the substrate, which forms the optical modulator, if the chassis fills the formed space, because the microwave could leak to the chassis side, the effect that was made by thinning the substrate could be reduced.

Therefore, there should be formed between the lower part of the electric signal connection pad unit and the chassis, enough space up to the point that would not leak any microwave to the chassis.

Figure 10:
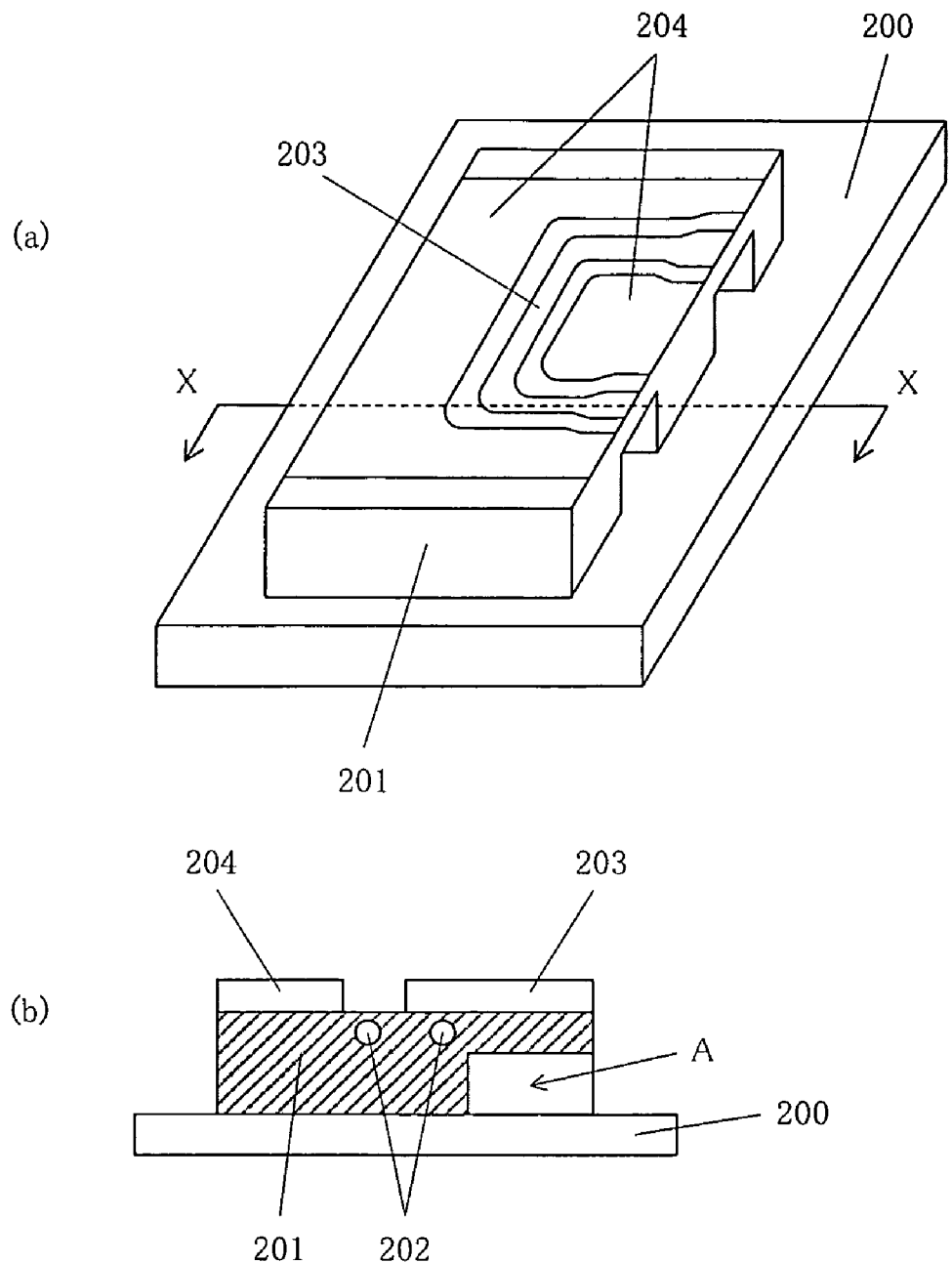
FIG. 10 is a diagram showing the optical modulator of FIG. 2 positioned on a chassis.

FIG. 10(a) is a diagram in which the optical modulator in FIG. 2 is positioned on a chassis 200 (a part of chassis). FIG. 10(b) is a cross-sectional diagram of FIG. 10(a) along the line X-X. 201 denotes a substrate; 202 an optical waveguide; 203 a signal electrode; 204 a ground electrode; and a part indicated by the arrow A is a cutting-off part. A space is formed between the substrate 201 and the chassis by the cutting-off part under the electric signal connection pad unit (right end of 203) as shown in FIG. 10(b).

In present invention, thickness of the part of the substrate located on or continuous to the electric signal connection pad unit is thinner. To be more precise, in the cutting off process of the rear face of substrate as in FIG. 3(a) to (c), or the side of the substrate as in FIG. 5, only a part of the substrate is only cut off. Therefore, when the temperature of the substrate changes, the heat stress to each part of the substrate becomes unequal, and in consequence, the character of the optical modulator will greatly depend on the temperature change. Especially, when the heat stress to light guide from the substrate's right and left across the wave-guide differs substantially, optical modulate character becomes unbalanced.

Therefore, in the Mach-Zender type wave-guide as shown in FIG. 1, the form of the substrate is desirable to form actual symmetry against the centerline of the divergent waveguides in the Mach-Zender type waveguide. To be more precise, as in the oblique lined parts of FIG. 7(a) to (c), by cutting off the substrate so that it becomes symmetrical against the centerline between the divergent waveguides (in FIGS. 7(a) to 7(c), shown as "centerline of waveguide"), the heat stress to the waveguide becomes equal in both sides.

Figure 7:
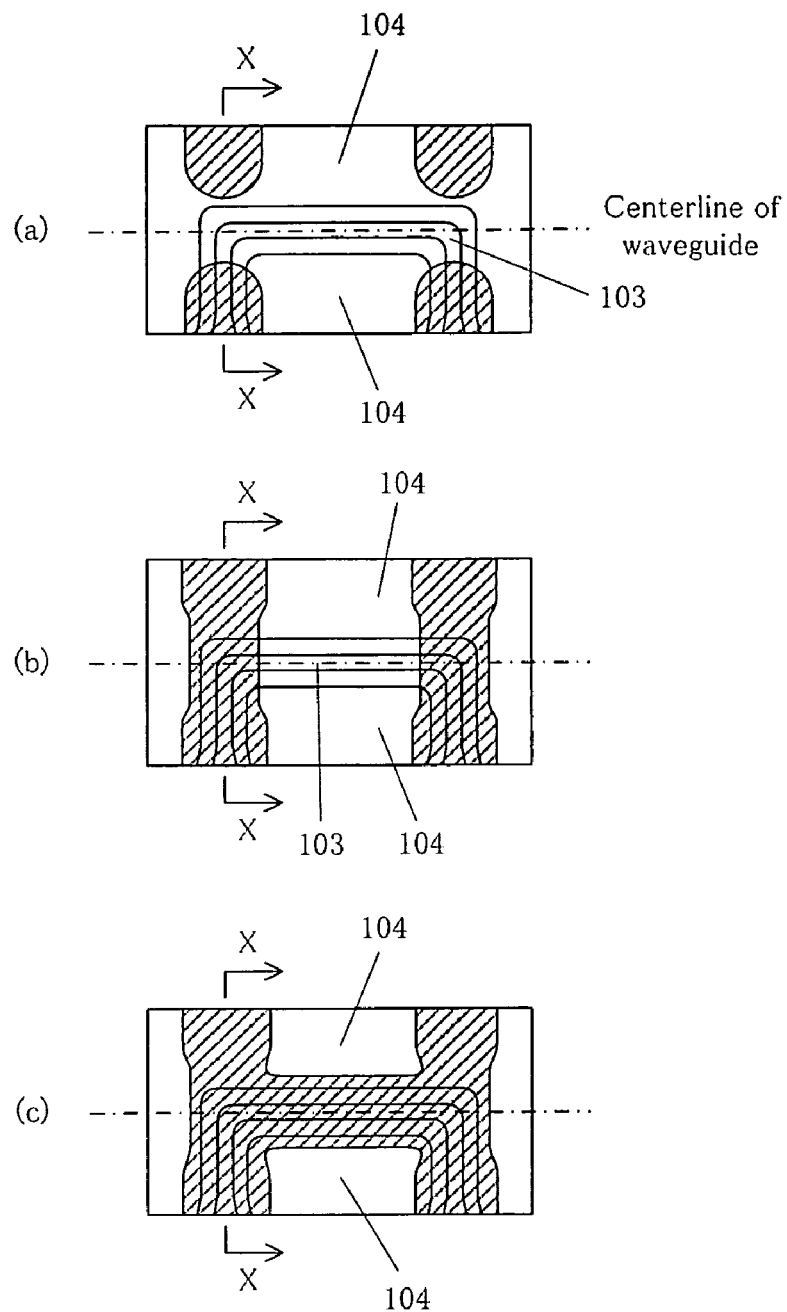
FIG. 7 shows the place to cut substrate for temperature characteristic improvement.
Figure 9:
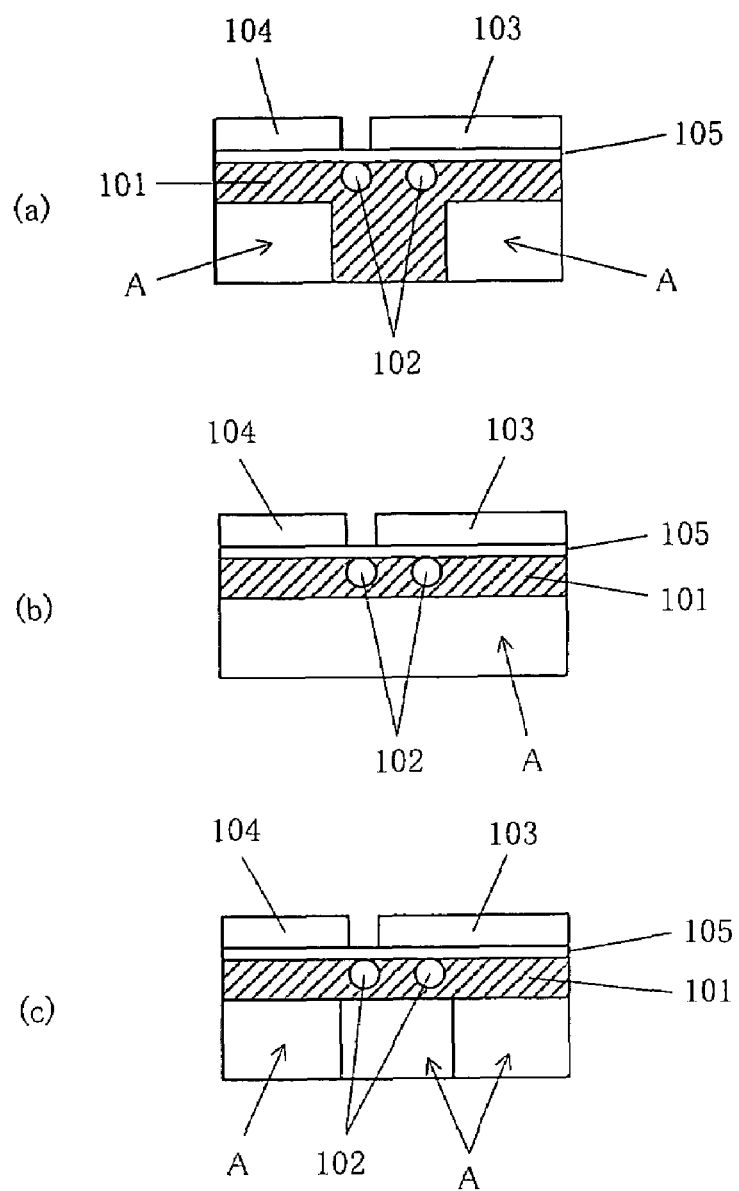
FIGS. 9(a)-(c) are cross-sectional diagram of respective optical modulators shown in FIG. 7.

In order to show respective cutting-off parts in FIGS. 7(a) to (c) more clearly, FIGS. 9(a) to (c) respectively show cross-sectional diagrams of FIGS. 7(a) to (c). FIG. 9(a) is the cross-sectional diagram of FIG. 7(a) along the line X-X. 101 denotes a substrate; 102 an optical waveguide; 103 a signal electrode; 104 a ground electrode; 105 a buffer layer; and a part indicated by the arrow A is a cutting-off part. In a similar way, FIG. 9(b) is the cross-sectional diagram of FIG. 7(b); and FIG. 9(c) is the cross-sectional diagram of FIG. 7(c).

INDUSTRIAL APPLICABILITY

As described above, according to the optical modulator of the instant invention, the thickness of the substrate that located on a lower part of at least the electric signal connection pad unit, and continuous to it, is made thin, controlling the cause of leakage inside the substrate and escape outside the substrate of the microwave in said pad area, and yielding an optical modulator which enables safe operation even in the high frequency broadband.

According to another aspect of the invention, since the thickness of a part of the substrate under the electrical signal connection pad unit is under about 250 μm, stable operation could be possible even if it is in high frequency broadband over 25 GHz.

According to another aspect of the invention, by forming a channel on the side of the substrate, because a part of the substrate under the electric signal connection pad unit is formed more thinly, the processing method will be easy and making accurate thickness of the thin part on the substrate will be possible, compared to the method of forming the substrate thinly from the rear face of the substrate by sandblasting.

According to another aspect of the invention, because a space between the chassis which holds the optical modulator and the electric signal connection pad unit is formed, prevention of microwave leak to the chassis side will be possible, yielding an optical modulator that can better control the reduction of microwave.

According to another aspect of the invention, because the substrate formed of the material having electro-optical effect is made of either $UNbO_3$ crystal, $LiTaO_3$ crystal, or solid solution crystal of $LiNbO_3$ and $LiTaO_3$, it can yield an optical modulator that is suitable to high-speed reply, and if this feature is added, it is possible to gain an optical modulator that is available to use for higher frequency broadband.

According to the optical modulator another aspect of the invention, the heat stress to the optical wave guide will be symmetrical, for thickness alteration of the whole substrate is under control so that it will be actually symmetrical against the centerline of the divergent waveguides in the Mach-Zender type optical waveguide, enabling control of the phenomenon of the optical modulator characteristics depending on temperature change.

The invention claimed is:

1. An optical modulator, comprising
a single substrate formed of a material having electro-optical effect,
an optical waveguide formed on said substrate,
an electrode for modulating light passing through said optical waveguide, said electrode comprising an interaction part and a bend point, and
an electric signal connection pad unit provided on a part of the electrode, wherein
a first part of the substrate which is located below said electric signal connection pad unit
is thinner than other parts of the substrate including a second part of the substrate which is located below the interaction part of the electrode, and
is less than about 250 μm,
and wherein a third part of the substrate which is located below said bend point of the electrode also
is thinner than the other parts of the substrate including the second part of the substrate located below the interaction part of the electrode, and
is less than about 250 μm.

2. The optical modulator according to claim 1, wherein the first part of the substrate which is located below said electric signal connection pad unit, and the third part of the substrate which is located below said bend point, are made thin by formation of a channel on a side of the substrate.

3. The optical modulator according to claim 1, further comprising a buffer layer formed between said electrode and said substrate.

4. The optical modulator according to claim 1, wherein the first part of the substrate which is located below said electric signal connection pad unit is made thin by formation of a channel on a side of the substrate.

5. The optical modulator according to claim 3, wherein the first part of the substrate which is located below said electric signal connection pad unit, and the third part of the substrate which is located below said bend point, are made thin by formation of a channel on a side of the substrate.

6. The optical modulator according to claim 1, wherein the optical modulator is supported by a chassis, and space is provided between a surface of the chassis and the electric signal connection pad unit, below the electric signal connection pad unit.

7. The optical modulator according to claim 2, wherein the optical modulator is supported by a chassis, and space is provided between a surface of the chassis and the electric signal connection pad unit, below the electric signal connection pad unit.

8. The optical modulator according to claim 1, wherein said material having electro-optical effect is a material selected from the group consisting of $LiNbO_3$ crystal, $LiTaO_3$ crystal, and solid solution crystal of $LiNbO_3$ and $LiTaO_3$.

9. The optical modulator according to claim 2, wherein said material having electro-optical effect is a material selected from the group consisting of $LiNbO_3$ crystal, $LiTaO_3$ crystal, and solid solution crystal of $LiNbO_3$ and $LiTaO_3$.

10. The optical modulator according to claim 1, wherein said optical waveguide is a Mach-Zehnder type waveguide having divergent waveguides, and a fourth part of said substrate which is located opposite to the first part of the substrate against a centerline of the divergent waveguides in said Mach-Zehnder type waveguide also is thinner than the other parts of the substrate including the second part of the substrate located below the interaction part of the electrode, so that the thickness of the substrate is practically symmetrical against the centerline of the divergent waveguides in said Mach-Zehnder type waveguide.

11. The optical modulator according to claim 2, wherein said optical waveguide is a Mach-Zehnder type waveguide having divergent waveguides, and a fourth part of said substrate which is located opposite to the first part of the substrate against a centerline of the divergent waveguides in said Mach-Zehnder type waveguide also is thinner than the other parts of the substrate including the second part of the substrate located below the interaction part of the electrode, so that the thickness of the substrate is practically symmetrical against the centerline of the divergent waveguides in said Mach-Zehnder type waveguide.

* * * * *